L. G. COPEMAN.
ELECTRIC COOKER.
APPLICATION FILED JULY 28, 1911. RENEWED DEC. 13, 1912.
1,053,280.
Patented Feb. 18, 1913.
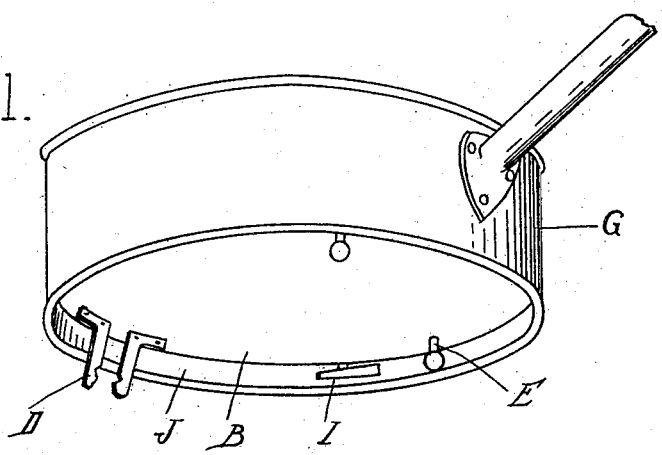
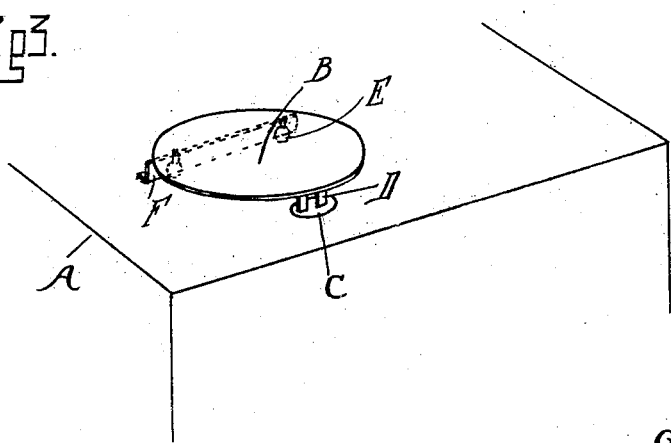
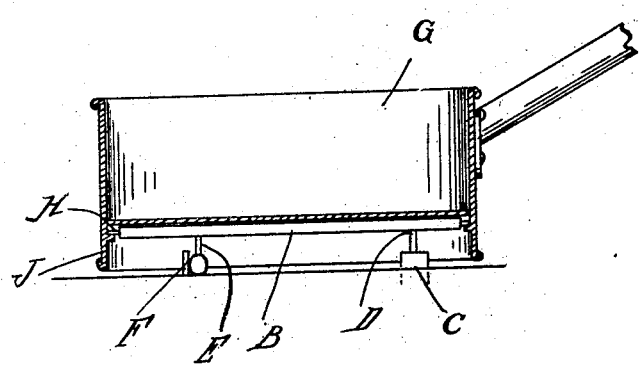
Witnesses
Inventor
Lloyd Groff Copeman
By Whittemore Hulbert + Whittemore
Attys

UNITED STATES PATENT OFFICE.

LLOYD GROFF COPEMAN, OF FLINT, MICHIGAN, ASSIGNOR TO THE COPEMAN ELECTRIC STOVE COMPANY, OF FLINT, MICHIGAN, A CORPORATION OF MICHIGAN.

ELECTRIC COOKER.

1,053,280.　　　Specification of Letters Patent.　　　Patented Feb. 18, 1913.

Application filed July 28, 1911, Serial No. 641,003.　Renewed December 13, 1912.　Serial No. 736,613.

*To all whom it may concern:*

Be it known that I, LLOYD GROFF COPEMAN, a citizen of the United States of America, residing at Flint, in the county of Genesee and State of Michigan, have invented certain new and useful Improvements in Electric Cookers, of which the following is a specification, reference being had therein to the accompanying drawings.

The invention relates to electric heaters more particularly designed for use in the cooking of food, and of that type in which the cooking utensil is suitable for holding the food when served.

It is one of the objects of the invention to obtain a construction in which the cooking may be effected on an electric range and after the completion the utensil with the heating unit attached thereto may be moved to the table for serving.

To this end the invention consists in the peculiar construction of the electric heating unit and a utensil engageable therewith, together with disengageable electric connections permitting the removal of the utensil and heater.

The invention further consists in certain features of construction as hereinafter set forth.

In the drawings,—Figure 1 is a perspective view of the utensil removed with the unit still attached thereto; Fig. 2 is a section showing the unit and the utensil in engagement therewith; Fig. 3 is a perspective view of the top of an electric range showing an electrical heating unit in place thereon.

A is a suitable stand for an electric cooking range and B is one of the electrical heating units. This unit is detachably engaged with the stand so as to complete the electric circuit therethrough preferably by providing a terminal socket C on the stand with which the terminals D of the unit are adapted to engage. The unit is also preferably provided with supporting legs E for holding it above the top of the stand and these legs are positioned by guide F on the stand. The arrangement is such that when the unit is placed in position it will be held from accidental displacement and without placing any undesirable stress on the terminal connections.

G is a cooking utensil which is also designed for use in serving food. The bottom of this receptacle is adapted to rest upon the face of the unit and to hold the same in good heat conducting contact therewith. There is preferably a cam engagement such as the pins H on the unit which engage cam shoulders I on a depending flange J on the utensil. Thus by placing the utensil over the unit in one position and then giving a slight rotation, the two will be locked together.

The arrangement just described is also one which permits of removing the unit with the utensil when the latter is carried to the table. This is due to the fact that the terminal connections D may be withdrawn from the socket C by an upward movement and thus it is merely necessary to lift the utensil by its handle to disengage the unit from the stand A. The arrangement is one which permits of utilizing all of the heat stored in the unit for maintaining the food hot as it is served. At the same time, the construction is one which permits of replacing the utensil upon the range for re-heating without either disengaging the unit, or the engagement of any separate electrical connections.

While I have described the unit as applied to a stand it is evident that it is equally applicable to an oven in which the utensil may be placed and engaged with the unit.

What I claim as my invention is:

1. The combination with a stand, of electrical terminal contacts thereon, an electrical heater supported on said stand and detachably engaging said terminal contacts, a guide for holding said unit from rotation, and a utensil rotatably engageable with said unit to clamp the same, whereby said unit is detached from the stand and carried by the utensil upon the lifting of the latter.

2. The combination with a stand provided with electrical terminal sockets, of an electrical unit having contacts for detachably engaging said sockets, supporting legs for said unit on said stand, a guide for positioning said legs upon the stand and for preventing rotation of the unit while in engagement with the socket, and a utensil having a rotatable locking engagement with said unit while in position upon said stand, said unit being removable in its locked position with the utensil upon the lifting of the latter.

3. The combination with a stand provided with electrical terminal connections, of an electrical unit supported on said stand and detachably engaging said terminal connections, and a utensil adapted to be moved into and out of locking engagement with said unit while the unit is in position upon said stand, said unit being removable in its locked position with the utensil upon the lifting of the latter.

In testimony whereof I affix my signature in presence of two witnesses.

LLOYD GROFF COPEMAN.

Witnesses:
E. D. BLACK,
DELLA G. SMITH.

Copies of this patent may be obtained for five cents each, by addressing the "Commissioner of Patents Washington, D. C."